May 26, 1964        I. J. GARY        3,134,212
LEAF AND PINE STRAW MULCHING LAWN MOWER ATTACHMENT
Filed Oct. 31, 1962        2 Sheets-Sheet 1
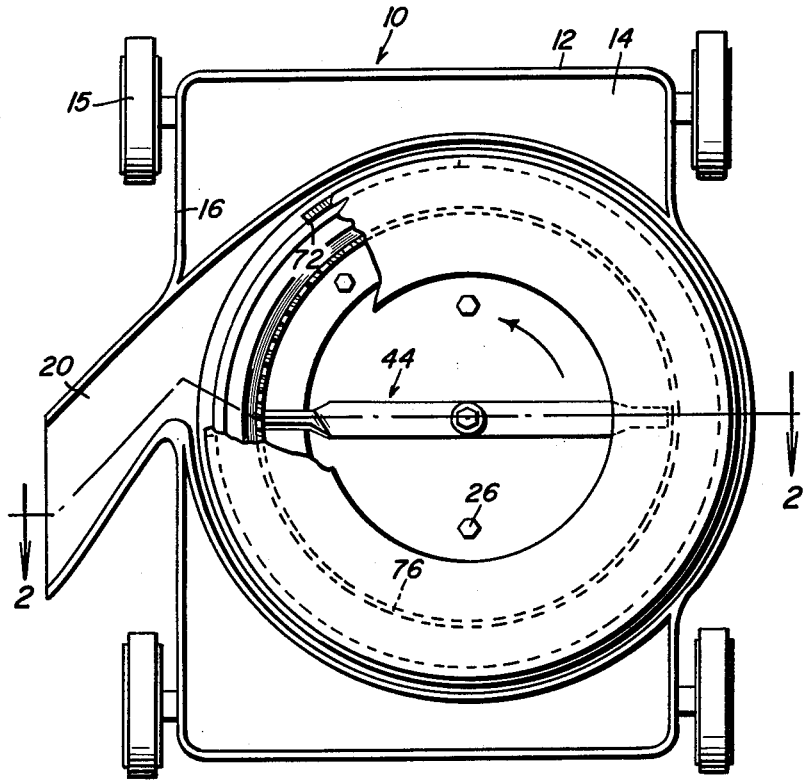
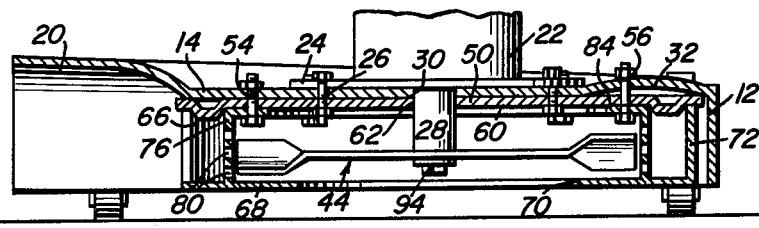
Ira J. Gary
*INVENTOR.*

May 26, 1964   I. J. GARY   3,134,212
LEAF AND PINE STRAW MULCHING LAWN MOWER ATTACHMENT
Filed Oct. 31, 1962   2 Sheets-Sheet 2

Ira J. Gary
INVENTOR.

United States Patent Office 3,134,212
Patented May 26, 1964

3,134,212
LEAF AND PINE STRAW MULCHING LAWN
MOWER ATTACHMENT
Ira J. Gary, 535 Aero Drive, Shreveport, La.
Filed Oct. 31, 1962, Ser. No. 234,334
10 Claims. (Cl. 56—25.4)

This invention comprises a novel and useful leaf and pine straw mulching lawn mower attachment and more particularly pertains to a mulching device comprising an attachment which may be readily secured to or removed from a conventional lawn mower of the rotary blade type to convert such lawn mower from its normal cutting operation into a highly efficient mulching operation of vegetation lying upon the ground.

It is the primary purpose of this invention to provide an attachment which may be readily applied to and easily removed from conventional types of lawn mowers of the rotary blade type and which shall be highly efficient in converting the conventional lawn mower from a mowing device to a vegetation mulching machine operated by the power plant and supported by the carriage of the lawn mower.

A further object of the invention is to provide an attachment in accordance with the preceding object which through the agency of an adapter plate element can be readily applied to various different types and configurations of conventional lawn mower housings.

A still further object of the invention is to provide a mulching attachment in accordance with the preceding objects which shall effectively perform its mulching operation throughout the entire 360° extent of the path of travel of the lawn mower blade and yet which will discharge the mulched material through the conventional lateral outlet of the lawn mower housing.

Still another purpose of the invention is to provide an attachment having a combined mulching screen and a mulch collecting means thereabout as a unitary assembly.

Still another purpose of the invention is to provide a device which will enable the conventional lawn mower mowing blade to be removed and readily replaced by a specifically designed mulching blade cooperating with the mulching attachment for effecting a greatly improved and more efficient mulching operation of various types of vegetation.

A still further object of the invention is to provide a mulching attachment in accordance with the preceding objects whose construction and cooperation with the mulching blade shall be such as to greatly increase the suction produced by that blade for drawing vegetation into the mulching blade, and yet shall fully protect the blade from striking rocks or other obstructions on the ground over which the device passes.

Yet another important object of the invention is to provide an attachment in compliance with the preceding objects in which the mulching chamber is so designed, constructed and so associated with the lawn mower frame and housing enclosing the lawn mower blade as to maintain without leakage a flow of air and vegetation into the mulching device, a radial extrusion of the vegetation through mulching apertures in the device, and the collection of the extruded comminuted material and its subsequent discharge through the conventional lawn mower housing lateral outlet opening.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a bottom plan view with portions being broken away to show certain internal structural features thereof and certain concealed parts being shown in dotted lines of a conventional power operated lawn mower of the rotary type to which the mulching attachment of this invention has been applied, the power plant of the mower being omitted therefrom;

FIGURE 2 is a vertical transverse sectional view taken substantially upon the plane indicated by the broken section line 2—2 of FIGURE 1 and showing the internal arrangement of the lawn mower housing and of the mulching attachment applied thereto; and, FIGURE 3 is an exploded perspective view of the various components of the mulching attachment.

Figure 3:
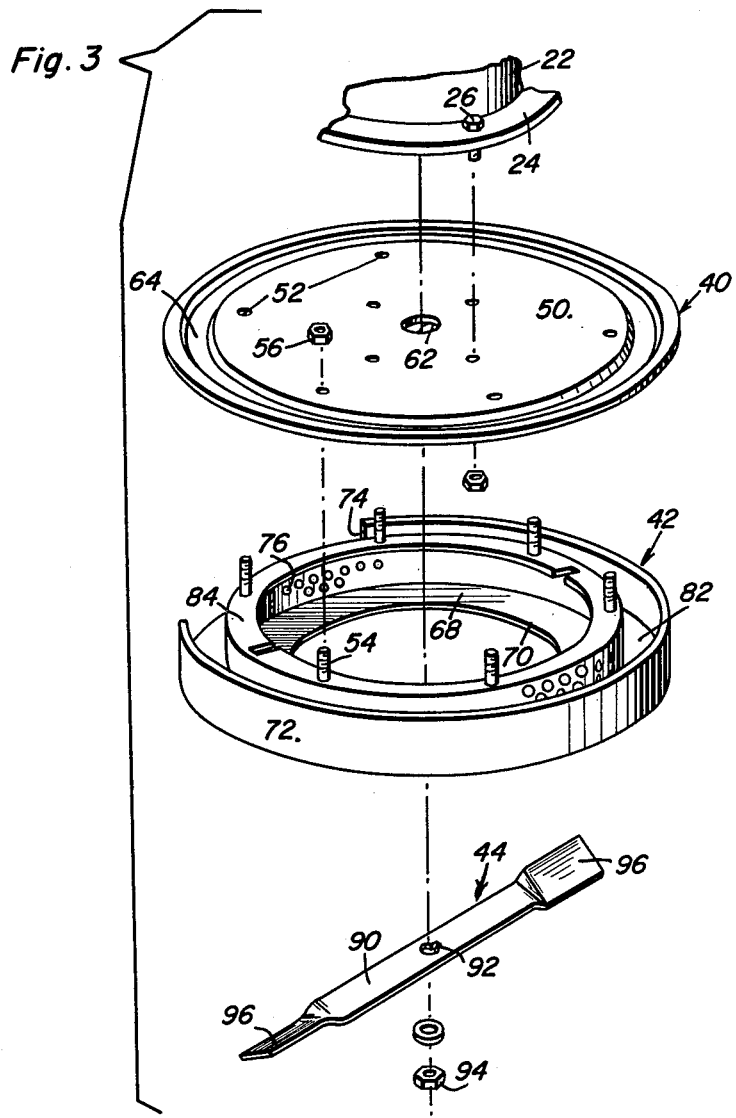

It is frequently desirable and extremely beneficial to thoroughly comminute or mulch grass cuttings or other vegetation and return this material in the form of a very fine mulch to the lawn. While attachments have been provided heretofore for lawn mowers of the rotary blade type for carrying out this purpose, they usually leave much to be desired in the efficiency of their mulching action and in the degree of fineness in their comminution of vegetation. This failure to attain their full objectives frequently arises from the inefficiency of the usual mowing blade as a mulching blade, lack of adequate suction and forced draft of vegetation conveying air to the mulching device, and the loss of such air velocity through leakage between the mulching blade, mulching baffle or screen and the housing of the lawn mower.

It is therefore the primary purpose of this invention to provide a device which may be readily applied as an attachment to conventional lawn mowers of different characters, but of the rotary blade type, and which will attain a greatly increased efficiency of mulching operation through the provision of a special blade particularly designed for effective operation as a mulching blade, a novel and greatly improved mulching screen extending throughout the entire path of travel of the mulching blade and enclosing it, a mulch collecting channel with a discharge directly into the customary lateral housing outlet of the lawn mower, together with an adapter plate by which a standard type of mulching attachment may be efficiently mounted on the underside of the top walls of lawn mower housings having different shapes and configurations, and thus attain a perfect fluid-tight fit therebetween preventing the escape of air. A further very important adjunct of the invention resides in so controlling through the construction of the mulching attachment the draft or inflow of air carrying vegetation from the ground into the mulching blade and into the interior of the mulching attachment for realizing a greatly increased efficiency of operation.

Referring now to the accompanying drawings, it will be observed that numeral 10 indicates any conventional power operated lawn mower of the rotary blade type having the customary carriage including a housing 12 having a top wall 14 and which housing is mounted upon conventional supporting wheels 15. The housing 12 as shown in FIGURE 2 has an open bottom and the generally flat top wall 14 has a peripheral depending skirt 16 which however is provided with a laterally extending outlet or discharge spout 20 by means of which the cuttings of the lawn mower blade are ejected to one side of the lawn mower.

The conventional lawn mower 10 further includes any suitable power plant such as that diagrammatically indicated by the casing or housing 22 and which is attachably secured as by means of its flanged lower end 24 and fastening bolts 26 to the top wall 14 of the housing. The power plant includes a drive shaft 28 which extends from the power plant 22 downwardly through a central opening 30 in the top wall 14 and into the chamber on the underside of the housing, where the shaft is provided with any conventional type of mowing blade, not shown. Various types of conventional lawn mowers usually have their top walls 14 of different contours and configurations and seldom are in the form of true planar surfaces. By way of example, the top wall 14 in FIGURE 2 is illustrated as having a vertically offset portion 32 which thus breaks the planar surface of the underside of the housing 14 and thus creates a condition rendering it difficult to establish an effective seal between a mulching attachment and the underside of such top wall.

As shown in the accompanying drawings, it is to a conventional lawn mower assembly of this general character that the mulching attachment of this invention to be now described is specifically adapted for ready attachment to and removal therefrom.

Referring now primarily to FIGURE 3 it will be observed that the mulching attachment of this invention comprises an adapter member or adapter insert indicated generally by the numeral 40 and which is so contoured and shaped as to its upper surface that it is adapted to be engaged upon the underside of the top wall 14 despite the presence of irregularities such as that indicated at 32 and establish on the underside of the adapter a true planar surface for a purpose to be subsequently apparent. Associated with the adapter insert plate 40 is the mulching attachment indicated generally by the numeral 42 and which is mounted upon and secured to the underside of the adapter plate 40, this insert comprising a basket-like structure within which is received a mulching blade indicated generally by the numeral 44.

Referring now specifically to the adapter plate 40 it will be observed that this consists of a disk-like member 50 having suitable fastener apertures 52 therein by means of which fastening bolts or studs 54 may removably secure the mulching attachment 42 and the adapter plate 40 to the underside of the top wall 14 as through the agency of nuts 56. As above mentioned, it is intended that the top surface of the adapter plate 40 shall be of such contour as to compensate for any irregularities such as that indicated at 32. Where the irregularities consist merely of upwardly depressed portions of the top wall, the adapter plate as indicated in FIGURE 2 may be planar and extend entirely across the top wall 14 beneath such irregularities 32. On the other hand, if the irregularities consist of downwardly projecting portions there will necessarily be corresponding depressions in the top wall of the adapter plate to accommodate such projections. In any event, it is intended that the adapter plates shall provide a planar surface as at 60 upon its underside and to which the mulching device 42 may be secured in a fluid-tight manner. As will be observed especially from FIGURE 3, there is provided a central opening 62 in the adapter plate through which the power shaft 28 extends and which is adapted to register with the opening 30 in the housing top wall 14. Further, there is provided adjacent the periphery of the adapter plate 40 a depressed annular channel 64 resulting in a downwardly projecting annular rib 66, see FIGURE 2. The purpose of this construction will be shortly apparent.

With continuing reference to FIGURES 3 and 2, it will now be observed that the mulching attachment 42 is of a basket-like construction, consisting of a horizontal annular flange 68 having a central opening 70 therein. Rising from the flange 68 is a generally circular peripherally extending upstanding wall, shield or rim 72 which forms a complete circle except for a cut-away portion or opening 74 therein which is adapted to register with the lateral discharge outlet 20 of the lawn mower housing 12.

Disposed concentrically of the outer wall 72 is a ring-like or cylindrical wall or screen 76 provided with multifarious perforations or openings 80 therethrough. These openings are of such size as to produce a very fine comminuting or pulverizing action upon leaves, pine straw or other vegetation forced outwardly therethrough whereby to produce a very fine mulch which collects in the collecting chamber 82 comprising an annular space lying between the exterior of the screen 76 and the peripheral wall 72. It will be noted that the screen 76 is integral with the flange 68 intermediate its inner and outer peripheries and is preferably at a uniformly spaced distance from the wall 72 likewise integral with the flange.

At its top edge, the screen 76 is provided with an inturned annular flange as at 84 which is of such width that it is adapted to be snugly abutted in a fluid-tight manner against the underside of the adapter plate 40 thereby preventing the escape of air therebetween. The radial width of the channel 82 is such that it will snugly accommodate the downwardly projecting annular rib 66 of the adapter plate 40 so as to likewise establish a top closure for this channel and an effective seal therebetween.

As so far described it will now be apparent that all air drawn upwardly through the opening 70 into the interior of the mulching screen will necessarily be discharged through the orifices 80 into the collecting channel 82 and from thence discharged through the outlet 74 into the lateral discharge opening 20 of the lawn mower housing.

The mulching blade 44 differs from the conventional mowing blade in that it includes a flat mid-portion 90 having an aperture 92 by which it may be secured upon the power shaft 28 as by a bolt fastener 94, together with terminal portions 96 at its opposite ends. While the central portion 90 lies in a horizontal plane, the terminal portions 96 lie in planes which are inclined at about a 45° angle to the horizontal plane. Further, these terminal portions are of sufficient length, as shown in FIGURE 2 to substantially completely overlie the flange 68 between the opening 70 and the screen 76. The terminal portions thus closely overlie the flange and also are closely adjacent to the screen.

As a result of this construction the mulching blade effects an upward flow of air carrying with it grass cuttings, pine straw and other vegetation through the opening 70 into the interior of the screen 76. Owing to the previously mentioned sealing constructions employed, this air is all directed together with the vegetation carried thereby radially outwardly through the orifices 80 of the screens. These orifices are of such size that they will effectively comminute or finely pulverize the leaves or other vegetation passing therethrough. By way of example, it is contemplated that the screen shall consist of orifices of ¼" diameter very closely spaced about the entire cylindrical area or surface of the screen. It has been found that orifices of this size are sufficient to very thoroughly and finely pulverize and comminute leaves, grass, pine straw and other vegetation so as to produce a powder as contrasted with the crushed particles usually discharged by the conventional mulching attachment of lawn mowers.

It should be noted that the inwardly projecting portion of flange 68 provides for a throttling effect limiting the area of the opening 70 as compared to the cross-sectional area inside the screen. This produces a greater suction thereby more effectively picking up vegetation and the inclination of the terminal portions 96 of the mulcher blade effectively produce a pressure to force this material through the fine orifices or perforations in the screen, then convey the collected mulch from the collection trough or channel 82 and discharge it through the registering outlets 74 and 20.

It should be noted that the disposition of the central portion of the flange 68 beneath the blades 96 will effectively protect the latter from engagement by stones or other obstructions which may be upon the ground and also against accidental contact of the foot of the user with the blades during operation of the device.

The disposition of the central portion of the blade 90 in a horizontal plane causes a minimum interference with flow of air upwardly through the opening 70 and then radially outwardly across the terminal portions 96 and into the screen 76.

It will be observed that the device can be readily applied or readily removed from conventional types of lawn mowers it being merely necessary to remove the conventional mower blade upon the completion of a mowing operation to apply this attachment and the mulching blade in order that a very efficient mulching operation may be performed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mulching construction for lawn mowers of the type comprising a downwardly opening housing having a generally horizontal top wall with a depending peripheral skirt having a lateral outlet for the discharge of grass cuttings from said housing together with a power source mounted on said housing and having a vertical power shaft with a blade thereon disposed in said housing; said construction comprising a ring shaped screen disposed within said housing, means supporting said screen upon said housing, said screen having a central opening in its bottom receiving and closely surrounding said blade and admitting vegetation to be mulched, said screen comprising an open topped annular collecting channel consisting of inner and outer cylindrical walls closed and joined at their bottom edges by a bottom wall, said inner wall being continuous and unbroken but having therein multifarious perforations establishing communication between said central opening and said collecting channel and being of sufficient size to comminute and mulch leaves and pine straws by passage therethrough from said central opening into said channel, said outer wall being imperforate but having a mulch discharge opening registering with said housing lateral outlet and a closure for the top of said channel.

2. The combination of claim 1 wherein said blade has its terminal portions disposed each in a plane inclined to both the vertical and horizontal planes whereby to throw and press vegetation entering said central opening against and through said perforated inner wall and into said collecting channel, said screen having an annular flange projecting into said central opening and underlying the entire length of said blade terminal portion and restricting the area of said central opening and increasing the velocity of flow therethrough.

3. A mulcher for power lawn mowers of the type including a housing having a generally horizontal top wall with a skirt depending therefrom and defining therewith a mowing chamber open at its bottom, said skirt having a lateral outlet for the discharge of grass cuttings from said mowing chamber together with a power source mounted upon said housing and having a power shaft with a blade thereon disposed within said mowing chamber; said mulcher comprising an annular collector disposed entirely within said housing and having an inner wall closely surrounding said blade and defining a mulching chamber open at its bottom through said mowing chamber open bottom, said inner wall having comminuting apertures therethrough establishing continuous communication between said mulching chamber and the interior of said collector, said collector having an outlet in continuous communication with said housing lateral outlet, said collector being closed from the atmosphere except for said apertures and said outlet.

4. The combination of claim 3 including an adapter element secured to the underside of said top wall, said collector chamber having an open top and said adapter element comprising a closure for said open top.

5. The combination of claim 4 wherein said adapter element has a top surface which is complementary to the bottom surface of said top wall and is engaged therewith.

6. The combination of claim 3 wherein said collector includes inner and outer walls open at their top, a closure for the open top of the collector comprising a plate having a depressed portion received within said open top and engaging said side walls.

7. The combination of claim 6 wherein said plate had a top surface which is complementary to and engages the bottom surface of said top wall.

8. The combination of claim 7 including common fastening means securing said collector to said plate and said plate to said top wall.

9. The combination of claim 3 wherein said collector includes equi-distantly spaced inner and outer side walls and is open at its top, said inner wall including at its upper end a radially inwardly extending flange, an adapter plate having a lower surface engaging the top of said side walls and said flange and closing said collector open top and having a depending projection recessed between and engaging the upper portions of said side walls.

10. The combination of claim 9 wherein said adapter plate has a top surface complementary to and engaging the bottom surface of said top wall, means fastening said plate to said top wall and said collector to said plate.

References Cited in the file of this patent
UNITED STATES PATENTS

| | | |
|---|---|---|
| 2,663,984 | Clark | Dec. 29, 1953 |
| 2,718,739 | Long | Sept. 27, 1955 |
| 2,942,400 | Sylvester | June 28, 1960 |